Patented Nov. 10, 1953

2,658,834

UNITED STATES PATENT OFFICE 2,658,834

METHOD OF PROTECTING METAL SURFACES, COMPOSITION THEREFOR, AND ARTICLE RESULTING THEREFROM

Carl A. M. Rex, Hoboken, N. J., assignor of one-half to Jack F. Govan and one-half to Roy H. Govan, both of Hoboken, N. J.

No Drawing. Application January 8, 1951, Serial No. 205,035

17 Claims. (Cl. 106—48)

The present invention relates to the coating of metals and other materials and more particularly to the coating of metal surfaces or the like to protect such surfaces when exposed to heat, oxidizing conditions, corrosive vapors and the like.

In the past, many coating materials have been proposed for use in protecting metallic surfaces. However, it has been found that such coating materials have been unsatisfactory in one or more of the following respects. At high temperatures, coatings such as organic type coatings have been found to decompose and burn and thus lose all of their protective characteristics. The enamel and ceramic glazes have been found to be incapable of withstanding severe thermal and percussive shock as well as the marked differences in the expansion coefficients of the various materials to which they are applied. None of the coatings previously proposed has been found capable of being applied to metals and other surfaces of material having widely different expansion coefficients such as iron, steel, aluminum, copper, stainless steel and the like, and which will adhere to such a variety of surfaces when thermal shock is imparted to the coating such as by heating followed by sudden cooling. In such cases the differences in the expansion of the metals and the coating occurs so suddenly as to set up enormous stresses and strains which dislodges the previously proposed coatings. Further, such coatings will not withstand flexing of the coated metal surface without dislodging the coating.

An object of the present invention is to provide a coating for metals and other materials capable of protecting such materials during heat treatment.

A further object of the present invention is to provide a coating which will protect metals against corrosion and is capable of withstanding thermal and percussive shock regardless of the differences in coefficients of the coating and the metals coated therewith.

A still further object of the present invention is to provide a protective coating for metals and the like which affords protection to the surface coated therewith in either a vitrified or non-vitrified form.

A still further object of the present invention is to provide a coating for metals and the like to protect against oxidizing or corrosive gases by reducing or reacting with such gases as they diffuse through the coating so as to protect the base metal or the like.

A still further object of the invention is to provide a coating for metals and the like which is capable of withstanding flexing of the coated surface without dislodging the coating.

Other objects and the nature and advantages of the instant invention will be apparent from the following description.

The coating composition of the present invention utilizes sodium meta borate in conjunction with a reducing agent. In addition, in the preferred embodiment, clay can be incorporated into the coating composition for certain purposes. When such ingredients are mixed in specifically determined proportions it has been found that the resulting material when applied as a coating by any suitable means provides a protection against corrosive vapors, fumes, oxidizing gases and the like to a wide variety of materials such as metals, all possessed of widely different characteristics. Further, when the coated metal is subjected to a temperature sufficient for the coating to vitrify and fuse, such heating can be continued considerably beyond such initial fusion point without decomposition, development of gas, formation of bubbles or otherwise developing a condition that would cause a disruption of the continuity of the coating film. Still further such vitrified coating, when subjected to severe thermal shock, tenaciously adheres to the metal surface.

The sodium meta borate utilized in the coating can be any of the materials commonly known as sodium meta borate, hydrated or anhydrous. Following are several examples which have been found to work successfully:

$NaBO_2 \cdot 2H_2O$
$NaBO_2 \cdot 4H_2O$
$Na_2B_2O_4 \cdot 4H_2O$
$Na_2B_2O_4 \cdot 8H_2O$
$NaH_2BO_3 \cdot H_2O$
$NaH_2BO_3 \cdot 3H_2O$ Instead of adding the sodium meta borate, in the above forms, equally good results can be obtained by admixing $Na_2O$ and $B_2O_3$ in mol ratios substantially equal to that existing in sodium meta borate. The sodium and boron compounds added can consist of alkalies of sodium together with oxides or acids of boron which, in combination, will give a sodium meta borate. Examples of the sodium alkali suitable for use are sodium oxide, carbonate, bicarbonate, hydroxide, or any organic sodium salt which upon thermal decomposition or ignition will give an alkaline ash of sodium oxide or carbonate. The boron compound used can be boron oxide, boric acid, borax or the like.

The inclusion of the clay is not essential, since effective coatings can be obtained for certain purposes without this ingredient. The inclusion of the clay, however, results in a fused vitreous product in which the borate acts as a flux for the clay. A suitable clay for use in the coating is a plastic clay. Such a clay, when mixed with water, assumes a plastic consistency and includes a rather narrow range of clays foremost of which are the ball clays of the ceramic industry. Clays which are not possessed of this plasticity are not suitable for use in the present invention.

The reducing agent incorporated in the coating must be comminuted to small particle size so as to distribute itself smoothly throughout the protective layer, to reduce the tendency to separate and stratify while the coating is air drying, and to present a maximum surface to contact the gases and corrosive vapors as they infiltrate into the coating. The reducing agent must be present in sufficient quantity to insure that there are no voids between the particles, but rather a continuity of particles adjoining and overlapping each other so as to present an effective barrier. Suitable reducing agents include graphite, carbon black, and powdered basic metals such as iron, chromite ($FeO \cdot Cr_2O_3$), and copper. The reducing agent selected should not react with the other ingredients of the coating compound to alter its reducing characteristics. Thus it will be seen that any of the acidic metals such as aluminum, zinc and so on will be unsuited. Oxidation inhibitors other than those listed above can be used as long as they are incapable of reacting with the meta borate.

The inclusion of the reducing agent in the coating in combination with the borate and the plastic clay elevates the fusion temperature of the flux as well as its boiling and/or decomposition temperature, for, when a suitable reducing agent is included, the resulting films after firing at considerably elevated temperatures, are significantly free from the bubbles and air inclusions that characterize compositions identical in all respects save the inclusion of the reducing agent.

Another function of the reducing agent appears to be traceable to its known affinity for oxygen, and as air tends to infiltrate through the coating, the oxygen which it carries and which in contact with the metal would cause its oxidation with the formation of mill scale or other oxidation products, is selectively removed before it reaches the metal and hence protects the metal from oxidation. Similarly, when other corrosive acids or reactive gases, vapors, fumes, etc. are encountered the interposed coating has a tendency to selectively absorb or combine with such before the infiltration or diffusion to the base metal can occur.

Additionally, this combination of ingredients appears to result in a vitreous coating possessed of considerable elasticity so that as stresses due to difference in expansion are encountered it successfully withstands any tendency of the surface to crack, check or dislodge itself.

In the application of the material to the surface to be coated, it is preferable that water be used to effect solution of the soluble ingredients and suspension of the insoluble ingredients, using sufficient liquid to form a slurry having the consistency of paint. If, in addition, a proportion of an organic adhesive or binding agent is added thereto either with the original dry materials or with the water used for solution and dispersion a better adhesion of the wet coating to the work is secured, and upon mere drying results in a coating that will withstand more handling and abuse than one prepared without the benefit of such adhesive material. Therefore, when applying the coating to the work it is deemed preferable to include an adhesive agent, such as dextrine, and the preferred embodiment of the invention makes use of the same. It is, of course, understood that any similar adhesive such as starch, gum, gum acacia, gum tragacanth, etc. can be utilized in place of the dextrine quite as effectively.

The inclusion of such adhesive is for the primary purpose of imparting desirable properties to the coating before heating, for upon heating the adhesive is decomposed at a relatively low temperature. However, by this time the natural adhesiveness of the coating itself begins to come into play and, of course, at high temperature the adhesiveness of the fused mass is brought into full force and effect.

In the application of this invention it has been found that the following range of proportions is satisfactory:

| | Per cent |
|---|---|
| $Na_2O-B_2O_3$ | 2.5 to 35 |
| Plastic clay | 0 to 40 |
| Reducing agent | 15 to 90 |
| Adhesive material | 0 to 20 |

In the preferred embodiment, the following are used:

| | Per cent |
|---|---|
| Sodium meta borate octa hydrate (based on the anhydrous salt) | 24 |
| Plastic clay | 39.5 |
| Reducing agent | 26 |
| Organic binder | 10.5 |

The following specific example is intended to illustrate the present invention, but is not intended to limit same:

50 lbs. powdered graphite
20 lbs. dextrine
75 lbs. Kentucky ball clay are mixed in a paddle mixer until all of the ingredients are uniformly distributed.

In a separate mixer, 95 lbs. sodium meta borate octa hydrate ($Na_2B_2O_2 \cdot 8H_4O$) and 25 gallons water are mixed until the borate is dissolved using heat if necessary.

To this solution, the dry ingredients are added while agitating, a little at a time. When all have been added the mixture is mixed for two and a half hours until all ingredients have been thoroughly and intimately distributed. In this form the batch is ready for use.

The surface to be coated is coated with the material in any suitable manner and then dried. The coated material even in this form is afforded protection against corrosion and oxidation, and the coating adheres well to the surface. Upon heating of the coated material, the coating will vitrify and the resulting vitrified coated surface may then be subjected to intense heat for long periods of time with sudden cooling, or alternate and repeated heating and cooling, and there is no indication of fusion, of oxidation or of wasting away of the material so coated.

It is a common failing of previous coating compositions utilizing sodium oxide-boron oxide mixtures that beyond their fusion points they tend to undergo a decomposition or evolution of gas due to vaporization or some similar phenomenon whereby bubbles are created in the otherwise smooth protective surface and which upon disruption causes a break in the continuity of the coating with exposure of bare uncoated surface. In accordance with the present invention, the utilization of a ratio of $Na_2O$ to $B_2O_3$ substantially the same as that existing in sodium meta borate, in conjunction with a reducing agent, preferably in elemental form, and plastic clay, if desired, results in a coating without this failing plus a myriad of desirable properties.

The preferred composition results in an increased fusion point as compared to the fusion point of the fluxing agent. Whereas sodium meta borate fuses at 1771° F., the coating in accordance with this invention does not fuse until much higher temperatures are reached. Metal coated with sodium meta borate alone and heated to the fusion point of the meta borate results in an immediate evolution of gas and blistering of the flux along with distinct evidence of the oxidation or burning of the metal. In contrast, when metal is coated with the coating composition of the present invention, the coating can be fused and heated considerably beyond the fusion point to much higher temperatures without any evolution of gas or other disruption of the film and with full protection of the metal against the corrosive and oxidation influences of air and gases.

Further, whereas coatings of meta borate even after fusion showed lack of permanence and protection during weathering tests by evidence of solution of the coating and initiation of rusting, coatings similarly prepared using the embodiment of this invention show a permanence of coating and resistance to corrosive attack vastly superior when similarly weathered.

As illustrative of the wide range of metals having different expansion coefficients to which this coating material has been applied successfully are the following:

| Metal | Coefficient $\times 10^{-6}$ |
|---|---|
| Aluminum | 18.35 |
| Copper | 14.09 |
| Iron | 8–10 |
| Steel | 10–13 |
| Stainless steel | 9–12 |

It is to be understood that the inclusion of other ingredients such as various oxides, pigments, etc. to produce a decorative effect, color opacity, or other physical change such as change in fusion point will suggest itself to those versed in the art and that any such modification does not detract or alter the basic invention embodied herein.

The field of application of this coating material is extremely varied and diverse and includes such applications as coatings for heat treating metal wire, plates, castings, etc., coating for jet engine exhausts, coatings for metals during welding or brazing, coatings for exhaust manifolds, coatings for casting molds, and many others.

It will be obvious to those skilled in the art that various changes may be made without departing from the spirit of the invention.

What is claimed is:

1. An improved composition of matter for use as a protective coating for oxidizable metals consisting substantially of 2½% to 35% by weight sodium meta borate, up to 40% by weight plastic clay, and 15% to 90% by weight of an inorganic material of reduced valence, termed an oxidation inhibitor incapable of reacting with the said borate selected from the group consisting of graphite, carbon black, iron and copper, said percentage of sodium meta borate being based on the weight of the anhydrous salt.

2. An improved composition of matter for use as a protective coating for oxidizable metals consisting substantially of $Na_2O$—$B_2O_3$ in mol ratios substantially equal to that existing in sodium meta borate to the extent of 2½% to 35% by weight, plastic clay up to 40% by weight, and 15% to 90% by weight of an inorganic material of reduced valence, termed an oxidation inhibitor incapable of reacting with the other constituents of the composition selected from the group consisting of graphite, carbon black, iron and copper.

3. An improved composition of matter for use as a protective coating for oxidizable metals consisting substantially of 2½ to 35% by weight sodium and boron compounds which in combination will result in mol ratio proportions of $Na_2O$ and $B_2O_3$ substantially equal to that existing in sodium meta borate, up to 40% by weight of plastic clay and 15 to 90% by weight finely divided graphite.

4. An improved composition of matter for use as a protective coating for oxidizable metals consisting substantially of 2½% to 35% by weight sodium meta borate, up to 40% by weight plastic clay, 15% to 90% by weight of an inorganic material of reduced valence, termed an oxidation inhibitor incapable of reacting with the said borate, selected from the group consisting of graphite, carbon black, iron, and copper, and up to 20% by weight of an organic viscid, gummy adhesive material, said percentage of sodium meta borate being based on the weight of the anhydrous salt.

5. An improved composition of matter for use as a protective coating for oxidizable metals consisting substantially of 2½% to 35% by weight sodium meta borate, up to 40% by weight plastic clay, 15% to 90% by weight of finely divided graphite and up to 20% by weight dextrine, said percentage of sodium meta borate being based on the weight of the anhydrous salt.

6. A coating composition in accordance with claim 5, wherein sufficient water is present in addition to the solid constituents to bring the material to the consistency of paint.

7. An improved composition of matter for use as a protecting coating for oxidizable metals comprising 24% by weight sodium meta borate octa hydrate, 39.5% by weight plastic clay, 26% by weight finely divided graphite and 10.5% by weight dextrine, said percentage of sodium meta borate octa hydrate being based on the weight of the anhydrous salt.

8. A metal surface to which has been added and dried thereon a protective coating consisting substantially of 2½% to 35% by weight sodium meta borate, up to 40% by weight plastic clay, 15% to 90% by weight of a finely divided inorganic material of reduced valence, termed an oxidation inhibitor incapable of reacting with the said borate selected from the group consisting of graphite, carbon black, iron and copper, and up to 20% of an organic viscid gummy adhesive material.

9. A metal surface to which has been added a protective coating which is vitrified thereon, said protective coating comprising 24% by weight sodium meta borate octa hydrate, 39.5% by weight plastic clay, 26% by weight finely divided graphite and 10.5% by weight dextrine.

10. A metal surface to which has been added and dried thereon a protective coating consisting substantially of 2½% to 35% by weight sodium meta borate, up to 40% by weight plastic clay, 15% to 90% by weight of finely divided graphite and up to 20% by weight dextrine, said percentage of sodium meta borate being based on the weight of the anhydrous salt.

11. The method of protecting a metal surface subjected to elevated temperatures which comprises coating the surface with a composition consisting of water and as the solid constituents thereof 24% by weight sodium meta borate octa hydrate, 39.5% by weight plastic clay, 26% by weight finely divided graphite and 10.5% by weight dextrine, sufficient water being present to render the mixture to the consistency of paint, drying the coating, heating the coated base until the coating melts, and thereafter allowing it to cool until solidified, said percentage of sodium borate octa hydrate being based on the weight of the anhydrous salt.

12. The method of protecting a metal surface subjected to elevated temperatures which comprises coating the surface with a composition consisting of water and as the solid constituents thereof 24% by weight sodium meta borate octa hydrate, 39.5% by weight plastic clay, 26% by weight finely divided graphite and 10.5% by weight dextrine, sufficient water being present to render the mixture to the consistency of paint, and drying the coating, said percentage of sodium borate octa hydrate being based on the weight of the anhydrous salt.

13. The method of protecting a metal surface subjected to elevated temperatures which comprises coating the surface with a composition consisting substantially of 2½ to 35% by weight of $Na_2O$ and $B_2O_3$ in mol ratios substantially equal to that existing in sodium meta borate, up to 40% by weight plastic clay and 15 to 90% by weight of finely divided graphite, and drying the coating.

14. The method of protecting a metal surface subjected to elevated temperatures which comprises coating the surface with a composition consisting substantially of water and as the solid constituents thereof 2½% to 35% by weight $Na_2O$ and $B_2O_3$ in mol ratios substantially equal to that existing in sodium meta borate, up to 40% by weight plastic clay, 15% to 90% by weight of a finely divided inorganic material of reduced valence, termed an oxidation inhibitor incapable of reacting with the said borate selected from the group consisting of graphite, carbon black, iron, and copper and up to 20% by weight of an organic viscid, gummy adhesive material, sufficient water being present to render the mixture to the consistency of paint, drying the coating and vitrifying.

15. The method of protecting a metal surface subjected to elevated temperatures which comprises coating the surface with a composition consisting substantially of water and as the solid constituents thereof 2½% to 35% by weight $Na_2O$ and $B_2O_3$ in mol ratios substantially equal to that existing in sodium meta borate, up to 40% by weight plastic clay, 15% to 90% by weight of a finely divided inorganic material of reduced valence, termed an oxidation inhibitor incapable of reacting with the said borate selected from the group consisting of graphite, carbon black, iron, and copper and up to 20% by weight of an organic viscid, gummy adhesive material, sufficient water being present to render the mixture to the consistency of paint, and drying the coating.

16. The method of protectively coating a metal surface subject to oxidation which comprises coating the surface with a composition consisting substantially of water and as the solid ingredients thereof 2½% to 35% by weight sodium meta borate, up to 40% by weight plastic clay, 15% to 90% by weight finely divided graphite and up to 20% by weight dextrine, sufficient water being present to render the mixture to the consistency of paint, and drying the coating, said percentage of sodium meta borate being based on the weight of the anhydrous salt.

17. The method in accordance with claim 16, wherein the dried coating is thereafter heated until the coating melts and thereafter allowing it to cool thereby solidifying and vitrifying.

CARL A. M. REX.

References Cited in the file of this patent

UNITED STATES PATENTS

| Number | Name | Date |
|---|---|---|
| 2,291,958 | Garrison | Aug. 4, 1942 |

FOREIGN PATENTS

| Number | Country | Date |
|---|---|---|
| 160,495 | Great Britain | 1921 |